United States Patent [19]

Cole et al.

[11] Patent Number: 4,468,266
[45] Date of Patent: Aug. 28, 1984

[54] BEAD AND FILLER ASSEMBLY MACHINE AND METHOD OF OPERATION THEREOF

[75] Inventors: Leon J. Cole; Edwin E. Mallory, both of Niles, Mich.; Hugh Bourassa, Cleveland, Ohio

[73] Assignee: National-Standard Company, Niles, Mich.

[21] Appl. No.: 475,912

[22] Filed: Mar. 16, 1983

Related U.S. Application Data

[63] Continuation of Ser. No. 250,159, Apr. 2, 1981, Pat. No. 4,410,389.

[51] Int. Cl.³ .............................................. B29H 17/34
[52] U.S. Cl. ..................................... 156/131; 156/398
[58] Field of Search .............. 156/136, 131, 460, 401, 156/403, 398, 405 R, 396, 111, 353, 370, 135, 244.18, 378; 83/374, 452, 458; 264/148; 425/289

[56] References Cited

U.S. PATENT DOCUMENTS

| | | | |
|---|---|---|---|
| 2,795,984 | 6/1957 | Sladek | 269/131 |
| 3,455,764 | 7/1969 | Bryant | 156/128 R |
| 4,163,683 | 8/1979 | Lammlein | 156/401 |
| 4,209,353 | 6/1980 | Colombani | 156/401 |
| 4,339,115 | 7/1982 | Benz | 269/132 |

Primary Examiner—Michael W. Ball
Attorney, Agent, or Firm—Emrich, Lee, Brown & Hill

[57] ABSTRACT

A continuously operating bead filler assembly system for forming filler material on top of a tire bead includes a multiple station assembly machine having at least one station for placing the bead and positioning the filler material in cylindrical form adjacent the bead and at least one station for forming and rotating the filler material on top of the bead. The multiple station assembly machine is used in conjunction with a rubber extruder, which continuously extrudes the filler material onto an accumulator, which delivers the filler material to a cutting and measuring device which cuts the filler material in predetermined lengths for deposit of the filler material in cylindrical form onto accumulator station.

8 Claims, 14 Drawing Figures

BEAD AND FILLER ASSEMBLY MACHINE AND METHOD OF OPERATION THEREOF

This is a continuation of application Ser. No. 250,159, filed Apr. 2, 1981, now U.S. Pat. No. 4,410,389.

BACKGROUND OF THE INVENTION

The present invention relates to the manufacture of fillered bead assemblies and, more particularly, to a continuous operating system which permits the assembly of bead filler material to the tire bead to form a fillered bead assembly for subsequent use in a second stage or single stage tire building machine for building vehicle tires.

In the past, it has been the practice in the formation of bead filler rings or fillered bead assemblies, that a tire bead is positioned on a cylindrical filler applicator and then a length of preformed filler material is drawn onto the filler applicator as the filler applicator is rotated. With the recent requirement for fillered bead assemblies with much greater cross-sectional heights and uniform fillers for radial tires and especially radial truck tires, this method is less than desirable. As the filler height to thickness ratio increases, it is extremely difficult to stand and hold the filler in an upright position on the outer circumference of a bead. Also, it is difficult to make a splice due to the varying degree of stretch which must be put into the filler from its base, where it rests on the bead, to its peak or outer circumference. Even if the newer method of fillering, utilizing a turn-up bladder, is used, the production time lost during the expansion of the turn-up bladder to position the filler material about the ring and then the subsequent removal of the bead and filler ring from the filler applicator has severely restricted and limited the number of bead filler rings that can be manufactured by this method of manufacture.

SUMMARY OF THE INVENTION

In accordance with the present invention, a suitable bead filler material is continuously extended in the form of an endless strip of desired and predetermined cross-sectional configuration, from an extruder means or portion onto the accumulator portion of the apparatus of the present invention. The endless strip of filler material on the accumulator portion is gravity fed to the cutting-measuring portion of the accumulator wherein the strip of filler material is stopped, and then cut into predetermined lengths. The cut strip of bead filler material is then driven, by engagement at the delivery portion of the cutting and measuring portion with the rotating applicator assembly station, onto an applicator assembly station and automatically positioned adjacent the bead, and the adjacent ends of the strip around the wire bead are joined together.

The multiple station assembly machine includes a plurality of applicator assembly stations. An applicator station is first positioned to cooperate with the delivery end of the cutting and measurement portion of the accumulator, the position hereby referred to as the first applicator position. When the bead ring and the cut strip of bead filler material has been automatically positioned adjacent the bead ring, the applicator station is then moved to a second forming position wherein the filler material is formed and rotated onto the bead. During this forming operation, another station is moved from the second forming position to the first applicator position wherein the finished fillered bead assembly is removed from the work station, a new bead ring is positioned thereon and the pre-cut length of filler material is automatically positioned adjacent the bead and the cycle is repeated.

Another feature of the present invention is an improved bead filler material accumulator for accumulating filler material continuously fed from the extruder means, during the intermittent positioning and forming of the filler material to the bead. The intermittent application of filler material onto successive work stations results because of the intermittent stopping of the feeding of the filler material at the first applicator position during removal of a completed fillered bead assembly from a work station and the positioning of successive bead rings thereon. Moreover, it is highly desirable not to start and stop the flow of the filler material from the extruding portion of the assembly during each removal of a completed fillered bead assembly and the positioning of a succeeding bead ring thereon in order to maintain the bead filler material at a desired and accurate configuration. Accordingly, to permit the continuous discharge of the filler material from the extruding portion, and at the same time to permit the starting and stopping of the flow of the bead filler material at the first applicator position, it is necessary to interpose an accumulator means between the extruder means and the filler applicator portion.

The present invention has important features which permit it to perform the functions of mounting and rotating the bead wire bundle or ring. The present invention rotates the bead while simultaneously driving the predeterminedly cut bead filler material onto the cylindrical bead filler applicator drum station for automatic positioning adjacent the bead.

A further feature of the present invention is the measurement and cutting of the bead filler material to a predetermined length corresponding to the circumference of the tire bead and bead filler applicator drum.

The operating machine in accordance with the present invention requires the usage of at least two work stations in the manufacture of the fillered bead assembly. Each work station is comprised of a cylindrical drum adapted to receive and hold a bead ring while it is positioned in the first applicator position. After the bead filler material has been placed on the cylindrical drum portion adjacent the bead ring, the loaded work station is rotated to a second forming position for further processing. Simultaneously with the movement of the loaded work station to the second forming position, a second work station having a formed fillered bead assembly thereon is rotated back to the first applicator position where the fillered bead assembly is removed and the cycle is repeated.

In a further embodiment of the present invention, it is further contemplated and disclosed herein the operating machine includes four work stations which are mounted to a rotatable turret assembly. In such a machine configuration, the cut filler material is automatically applied at a first applicator position. The work station is rotated 90° and is engaged by a positioning plate which automatically positions a bead ring adjacent the filler material. The work station is then rotated 90° wherein the forming operation is accomplished and the filled material is turned-up and sealed to the bead ring. Next, the work station is rotated another 90° and the formed fillered bead assembly is removed onto conveying means.

Lastly, the work station is again rotated 90° to the first applicator position to repeat the cycle of operation.

The variations of the present invention provide for an apparatus wherein maximum speed and uniformity is achieved in manufacturing fillered bead assemblies.

Other features and advantages of the present invention will be apparent from the following description and claims and are illustrated in the accompanying drawings. Other embodiments of the present invention embodying the same or equivalent principles may be used and structural changes may be made as desired to those skilled in the art without departing from the present invention and purview of the appended claims.

DESCRIPTION OF THE DRAWINGS

FIG. 10 is a fragmentary front elevational view taken along lines 10—10 as shown in FIG. 9;

DETAILED DESCRIPTION

Figure 1:
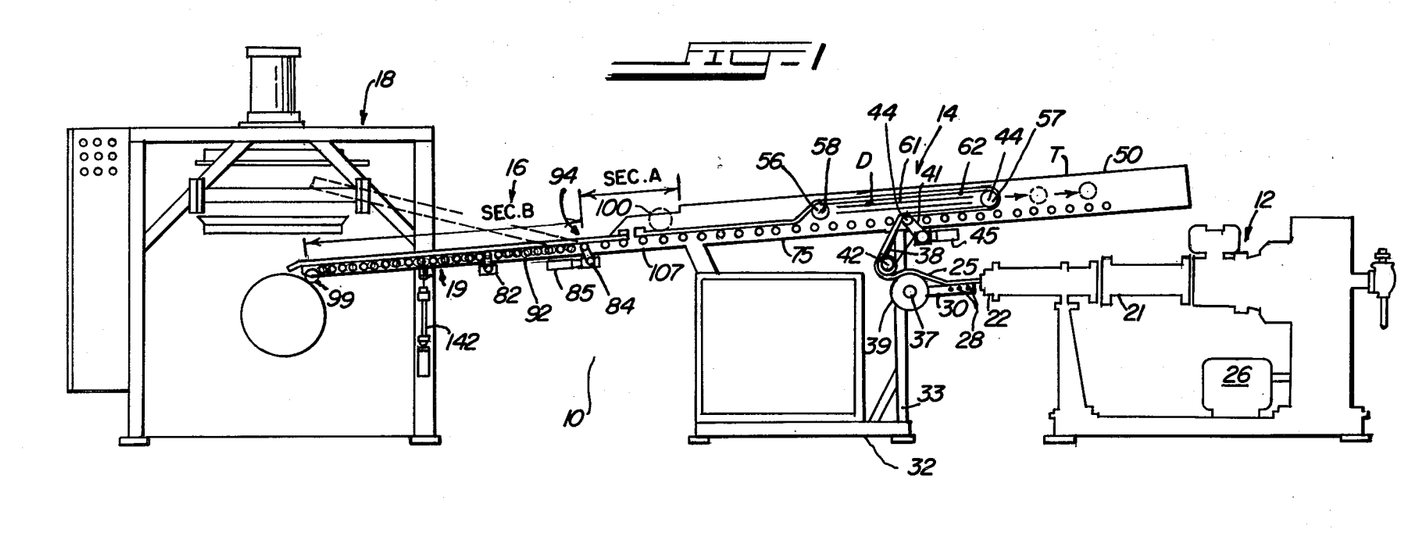
FIG. 1 is a side elevational view of the entire bead filler assembly machine in accordance with the present invention.

Referring now to the drawings wherein like numerals have been used throughout the several views to designate the same or similar parts, there is schematically shown in FIG. 1, the bead filler assembly apparatus or machine 10 which is comprised of essentially four units or portions in sequence:

(1) an extruding means or portion 12 of known construction which extrudes the bead filler material in a continuous endless strip;

(2) an intermediate accumulator means or portion 14 which is of known construction;

(3) a cutting, measuring and delivering means or portion 16 comprised of Sec's. A and B which measures and cuts the bead filler material to predetermined lengths and drives the filler material onto the drum stations, respectively; and (4) a multiple work station applicator assembly or portion 18 wherein the strip of bead filler material is positioned adjacent to the bead and formed to the bead to provide a fillered bead assembly 11.

The extruder portion 12 is of known construction and is comprised of internal apparatus which heats, masticates and conveys bead filler to a discharging feed screw (not shown) enclosed within a feed tube 21 having a discharge head 22 at its outer end. The filler material issues through a die (not shown) at the head 22 in the form of a continuous strip designated 25. The die at head 22 is selected to provide a strip of bead filler material 25 of a desired cross-sectional configuration. The extruder 12 and the feed screw (not shown) within the feed tube 21 are driven from any suitable power source such as an electric motor 26, by a drive means (not shown). The die at the discharge head 22 is preferably suitably removably mounted so that dies for any desired bead filler configuration may be readily substituted one for the other.

From the discharge head 22, the strip of bead filler material 25 passes over conveying means comprising a set of rotatable conveyor rollers 28 freely rotatably mounted in juxtaposed relation between cantilever arms 30 projecting from the corner legs 33 of frame 32. The cantilever arms 30 may be pivoted downwardly to provide access for changing the die in the heat 22 of the extruder means 12. The rollers 28 are spaced with respect to each other to support the bead filler material 25 and prevent it from sagging to maintain the dimensions of the strip stable and substantially of the configuration issuing from the die of the extruder. The platform formed by these rollers 28 is lightly loaded upwardly and able to pivot downwardly due to bead filler weight. When the platform is pushed downward due to excess filler material, a potentiometer (not shown) sends en electrical signal to the drive motor 45, operatively connected by linkage 41 to drive roll 44 to increase the speed thereof. Because the sprockets 44a are positively driven together by linkage 43 (FIG. 8), and roll 42 is driven by linkage 38, rolls 42, 44 and 44a are all driven at the same peripheral speed to transfer the filler material 25 from the extruder head 22 onto the accumulator conveyor rolls 75 (FIG. 1). Accordingly, an automatic speed control device is thereby effected by drive linkage 41 coupled to motor 45 mounted on channel members 50. From the transfer roll 39 the strip of bead filler material 25 passes under a guide roll 42 secured to the back sides of the vertical frame legs 33. From the guide roll 42, the bead filler material passes upwardly around and over the top of the drive roll 44, hereinafter described in greater detail. The drive sprocket 44a has its axis shaft 47 suitably mounted on the machine frame channel members 50. The drive sprockets 44a are driven by a chain linkage 43 from driven roll 44. Electric motor 45, having variable selective speed characteristics, or through a variable speed drive mechanism having selectable speeds, provides a desired speed of rotation drive roll 44. Roll 42 and sprockets 44a are also driven at the same peripheral speed as drive roll 44 by linkages 38 and 43 respectively.

The accumulator means 14 is incorporated into the intermediate frame portion of the conveying means. Thus, according to one embodiment of the present invention, there is extending along the top of the machine 10 a long trackway frame T of box-like cross-section within which the accumulator dolly means D has to-and-fro movement. This trackway T of known configuration comprises two spaced channel members 50. It will be noted that this trackway frame has a slight downward inclination from right to left, of approximately 5°, so that gravity will tend to propel the dolly meand D downwardly toward the left or rear end of the trackway to where the bead filler material cutting and measuring means 16 is positioned. Reference is made herein to U.S. Pat. No. 3,455,764 which relates to the accumulator means, and which is assigned to the assignee of the present invention.

Figures 8, 9:
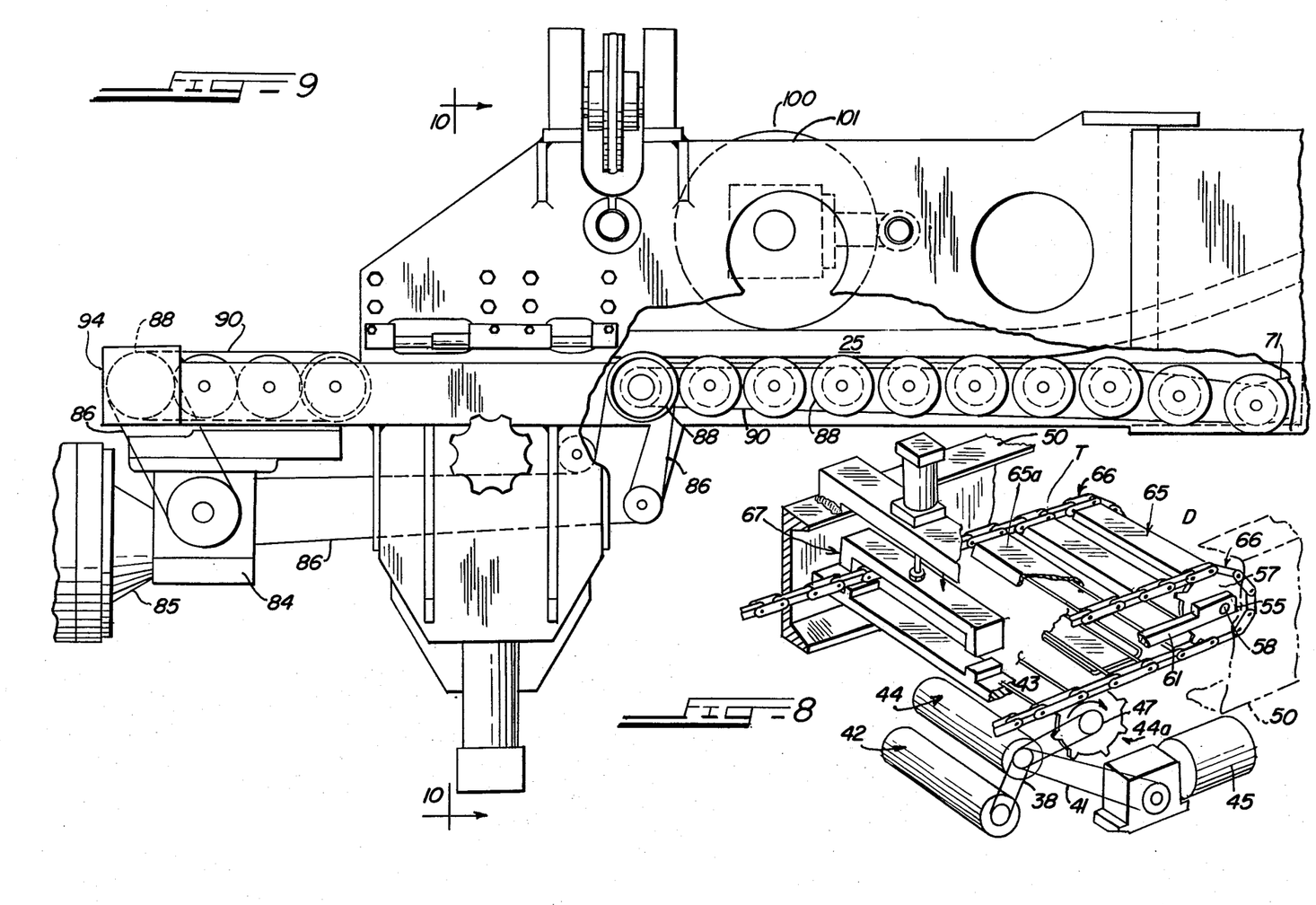
FIG. 8 is a fragmentary perspective view of a portion of the dolly mechanism of the accumulator means in accordance with the present invention.
FIG. 9 is a fragmentary side elevational view of the cutting mechanism of the cutting and delivering section in accordance with the present invention.

Carried by the channel members 50 are dolly wheels 56 and 57, dolly belt 65 and paddles 65a secured adjacent their opposite ends to the webs of the channel members 50. Movable along these rods is the carriage or dolly means D comprising spaced front and rear wheels 56 and 57 having their axles 58 and 59 mounted in bearing bushings 55 which have free sliding engagement with the circular guide rods (FIG. 8). The bushings 55 are fastened together at fixed fore and aft spacing by side frame stingers 61 of the dolly frame 62. The circular rods extend almost the entire length of the channel members 50 to accommodate a substantial range of to-and-fro longitudinal sliding movement of the dolly means D.

The dolly means D further comprises an endless dolly belt 65 (FIG. 8) composed of a ladder chain 66 or other suitable material trained over the end rollers or sprockets 56 and 57. The dolly belt 65 is wider than the strip of bead filler material 25, for accommodating the strip of bead filler material thereon. The belt 65 includes sheet metal paddles 65 thereon to minimize contact with the extruded rubber material.

Referring again to FIGS. 1 and 8, it will be seen that on the top of the trackway frame at a point substantially above the drive sprocket 44a there is provided brake means 67 of known configuration, which engages the side edges of the endless dolly belt 65 laterally outwardly to the strip 25 on the belt along its top run. When this brake is clamped, the dolly D starts accumulating bead filler material 25.

Movement of the dolly D to the right, for material accumulation, is effected by drive imparted by driving means comprising drive sprockets 44a connected to rolls 44, 42 and electric drive motor 45. The aforementioned brake means 67 holds the upper run of the belt 65 to provide a reaction point for the driving force of the driving means, defined by lower sprockets 44a. Such drive continues to impart movement of the dolly towards the right as long as the brake means is engaged (clamped). Such movement afforded by such drive will continue to accumulate bead filler stock in the accumulator means until the brake means 67 is released allowing gravity to act or until the right-hand end of the dolly sprocket 57 strikes an end limit switch (not shown) for stopping the extruder 12.

When the dolly means D moves to the right, as shown in FIG. 8, the lower run of the filler material, unless supported, may tend to sag down objectionably altering the desired predetermined dimension thereof. To prevent this sagging and retain the dimensional stability of the strip of filler material first supporting means may comprise a series of freely rotatable conveyor rollers 75 rotatably mounted in close parallel relation between the trackway beams at the right-hand end of the trackway. In lieu of such conveyor rollers, an endless conveyor belt may be utilized to support any sagging portion of the filler strip. Release of the brake means 67 allows material to be drawn off the accumulation system by cutting and delivery section of the system, as shown in FIG. 9.

At the left-hand portion of the trackway frame, second supporting means comprising a similar series of conveyor rollers 75 is provided to support the filler strip 25 being laid off the upper run of belt 65 when the dolly D is moving to the right, best shown in FIG. 1.

Measuring element or means 100 is located along the cutting, measuring and delivering means or portion 16 and measures segments of the strip of bead filler material 25 corresponding in length to the circumference of the bead ring that is mounted on a building drum. The measuring means 100 is associated with a shaft encoder means 82 (FIG. 1) to direct the cutting means or blade 104 (FIG. 10) to cut the filler strip 25 into the predetermined length. The measuring means 100 includes a measuring wheel 101 (FIG. 9) which is engageable with the strip of filler material 25. As the strip of filler material 25 passes beneath the wheel, the wheel rotates and measures the travel of the strip along its periphery. When the rotational travel of the periphery of the measuring wheel is equal to the circumference of the bead ring or bundle mounted on the building drum, the measuring wheel indicates, either mechanically or electrically, to the measuring control means to disengage the clutch assembly 84 (FIG. 9) of motor 85 which is connected via linkages 86 to sprocket rolls 88 which are positively driven by linkage 90. The control means electrically activates the cutting blade 104, as hereinafter described.

The cutting assembly or means (depicted in Sec. A in FIG. 1) is illustrated in FIG. 10. A blade 104 is slideably mounted on a track 105 supported on and perpendicular to the conveying means. Affixed to the top of the blade is a flexible cable 106 extending around and supported by two pulley wheels 108 and 108' which are connected to a reciprocating air cylinder assembly 109 which reciprocates the cable and the blade back and forth across the width of the conveying means and through the filler material 25.

Figures 11, 13:
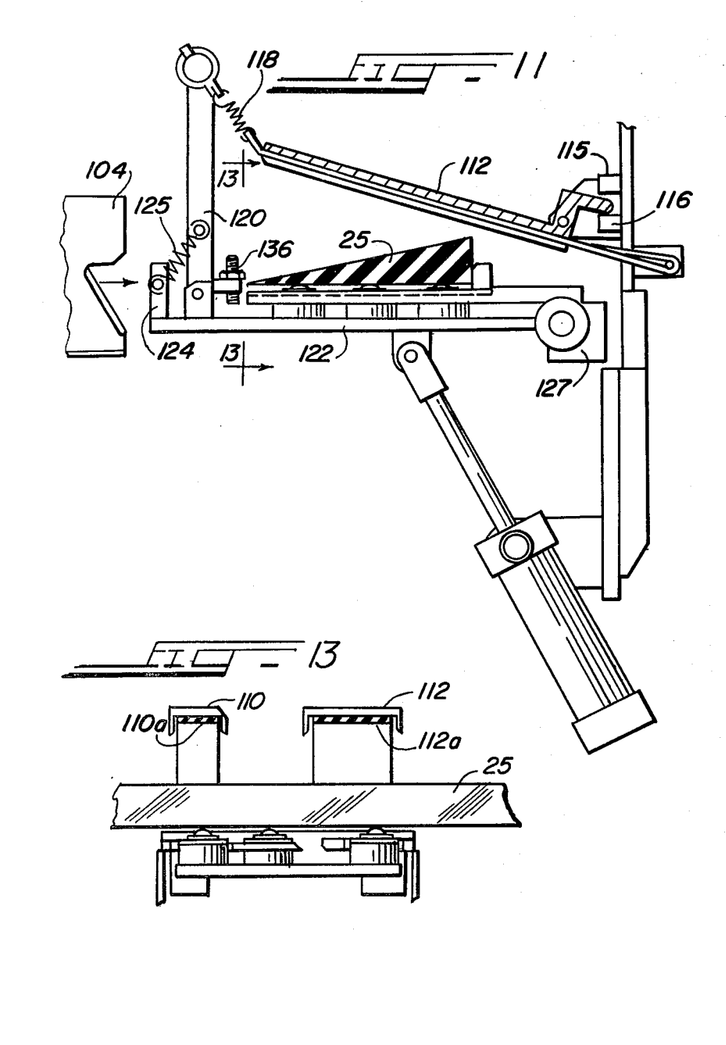
FIGS. 11 and 12 are fragmentary front elevational views of the cutting and filler material clamping mechanism showing the positions of the clamping unit in accordance with the present invention.
FIG. 13 is a fragmentary side elevational view taken along lines 13—13 as shown in FIG. 11.
Figures 12, 14:
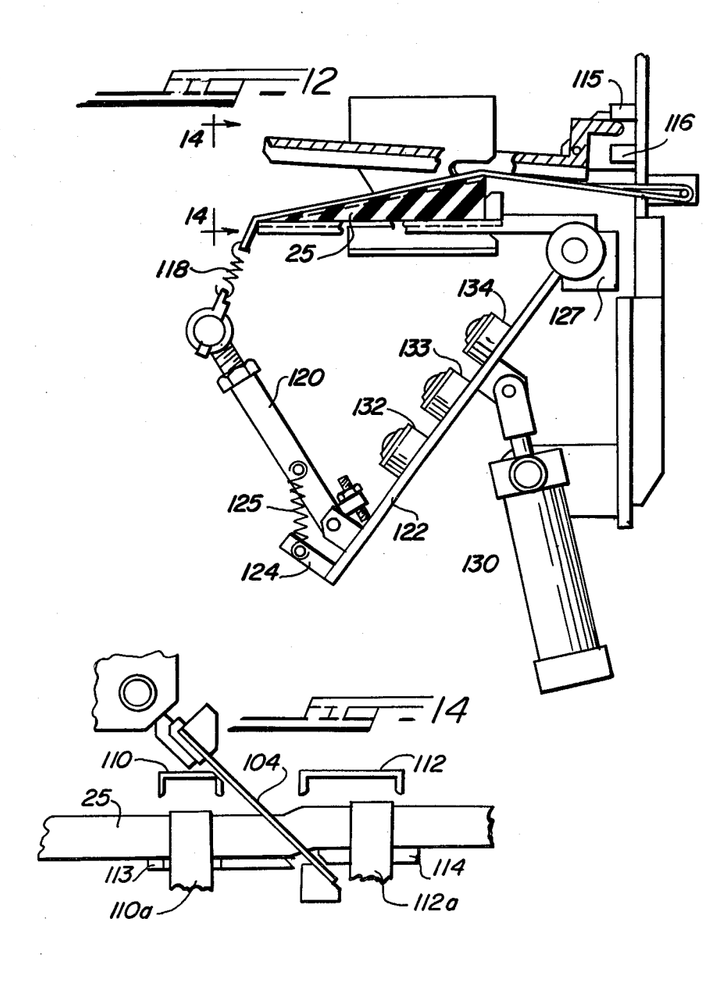
FIG. 14 is a fragmentary side elevational view taken along lines 14—14 as shown in FIG. 12.

Referring now to FIGS. 11–14, the strip of bead filler material 25 is held in place during the cutting process by securing straps 110a and 112a positioned on each side of the cutting edge of blade 104 (FIG. 14). As shown in FIG. 14, the platforms 113 and 114 positioned below and on either side of the path of travel of the blade 104 are at different levels to introduce tension into the filler material 25 as it is clamped by straps 110a and 112a. This reduces drag between the blade and the material and produces a cleaner cut. The straps are pulled into the hollowed out bars 110 and 112, thus insuring that the filler material does not adhere to the straps. As shown in FIGS. 11–12, the stripper bars 110 and 112 are of generally Z-shaped appearance having a bottom section that extends substantially the width of the conveying means and a shorter post and upper section. The Z-shaped bars 110 and 112 are pivotally mounted on the supporting structure at the intermediate post with the short upper portions holding the bars in place between two stops 115 and 116. The straps 110a and 112a are attached to a spring means 118 which is in turn attached to an arm 120. Vertical arm 120 extends downward below the bead filler material 25 and is pivotally connected to a horizontal arm 122. Horizontal arm 122 includes a post 124 which extends upwards and contains a spring means 125 attached to vertical arm 120, which holds vertical arm 120 in an upright position. Horizontal arm 122 is pivotally connected at the other end to a supporting structure 127. A cylinder 130 is pivotally attached to horizontal arm 122 in its mid area.

Mounted on the horizontal arm 122 are three roller bearings 132, 133, 134 for the support of the bead filler material 25. The encoder 82, through suitable electrical hardware (not shown), provides a signal which energizes the cylinder 130 to pull horizontal arm 122 and the roller bearings mounted thereupon downward as the blade 104 moves across the conveying area. The downward movement of horizontal arm 122 pulls vertical arm 120 mounted thereupon downward also. A post 136, extending outward from vertical arm 120 towards the bottom near its pivot point with arm 122, provides an adjustment means to control the arc of its movement. As vertical arm 102 is pulled downward, straps 110a and 112a are pulled downward across the strip of bead filler material holding it in place as the blade slices through. The advantage of these flexible straps is that they are able to conform to the many different shapes of fillers which may be encountered. The rollers 132, 133 and 134 perform two separate functions: They support the material for transport through the cutting assembly during the measurement mode, retracting during cutting so that the material can be clamped by straps 110a and 112a against a rigid platform, and then insuring that the filler material is broken loose from the rigid platforms 113 and 114 by lifting it up after cutting.

Figure 2:
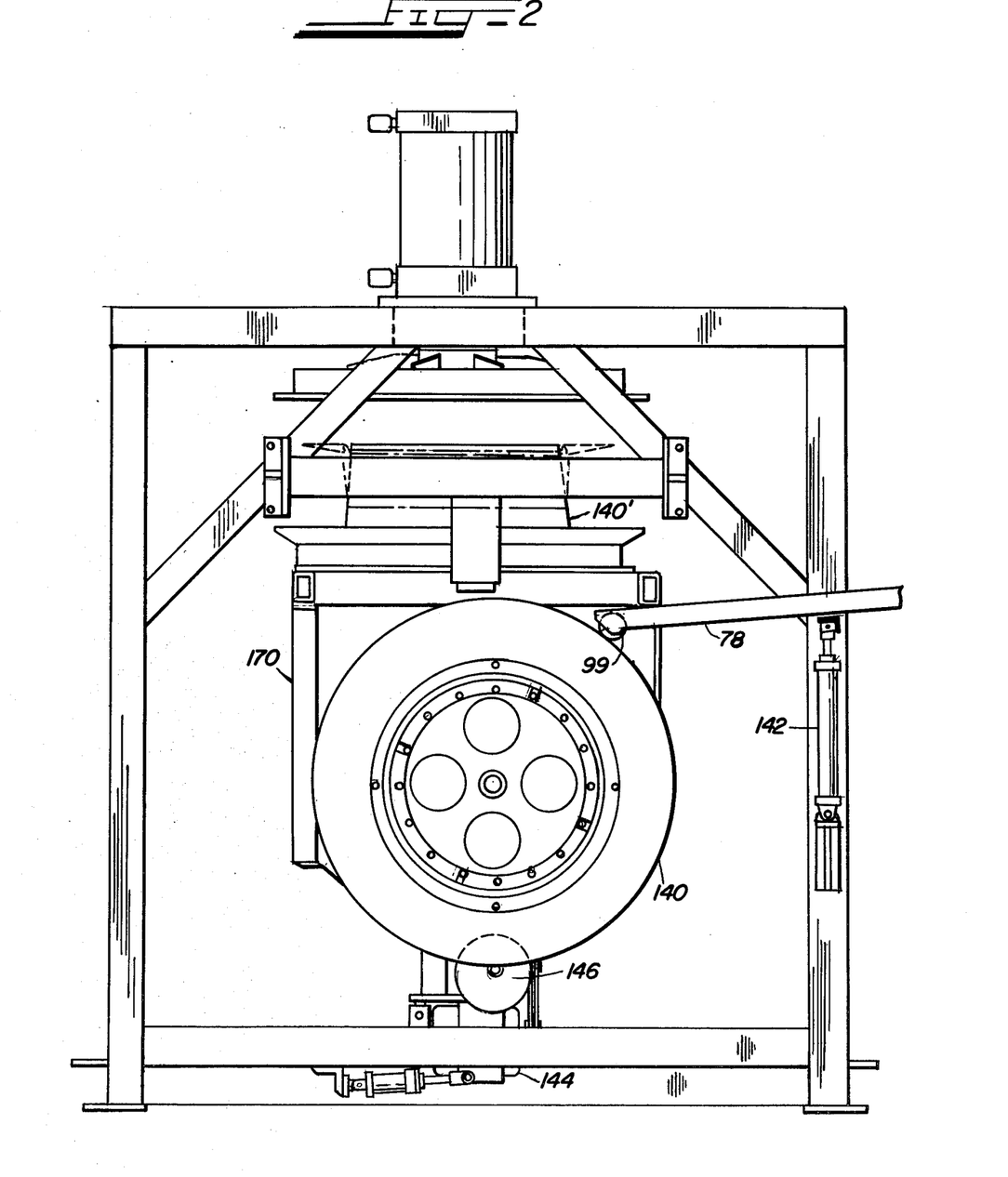
FIG. 2 is a side elevational view of a two-station bead filler applicator machine in accordance with the present invention.
Figure 4:
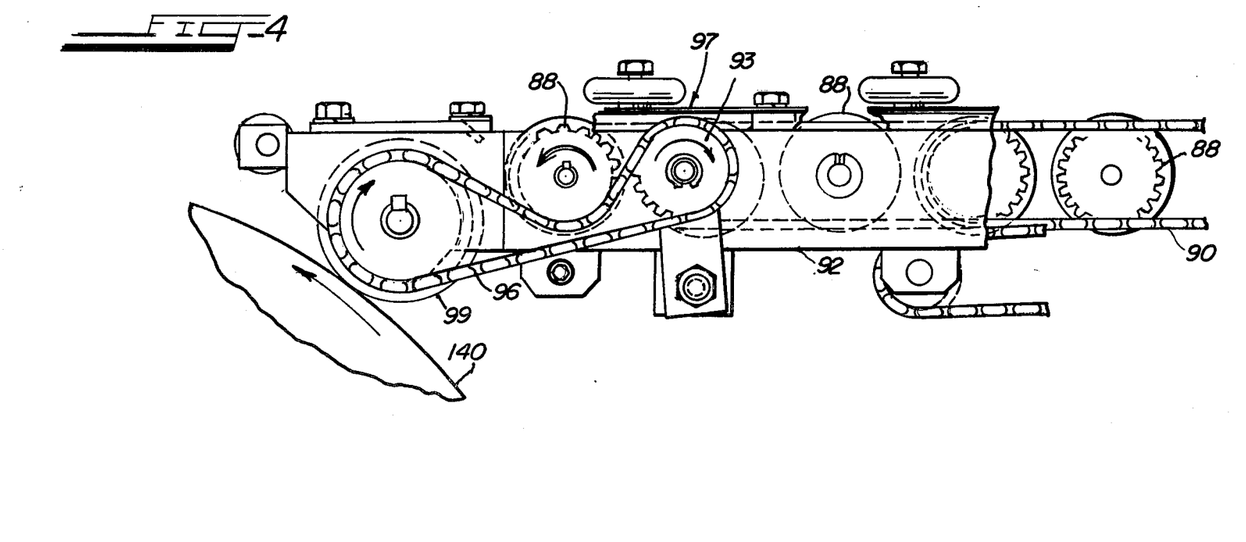
FIG. 4 is a fragmentary side elevational view of the end applicator arm portion of the cutting and delivering section illustrating the use of the rubber drive wheel to drive the strip of filler material onto the work station located in the applicator position without distortion in accordance with the present invention.

As the filler material 25 passes to the left from conveyor rollers 75 (FIG. 1) to the bead filler applicator element 19 (designated in Sec. B in FIG. 1) the filler strip is supported by a series of rollers 88. The bead filler applicator element 19 comprises a series of rollers 88 having sprockets thereon, mounted in an upwardly swinging feed conveyor frame 92 pivoted 94 to the main frame 95. The outer end 97 of pivotal conveyor frame 92 supports conveyor feed rollers 103 over which the bead filler material passes downwardly to its bead applying position on the building drum 140. As best seen in FIGS. 1, 2 and 4, a drive roller 99 is rotatably mounted on the underside of frame 92. The roller 99 is adapted to be rotated by and when engaged with the peripheral surface of the building drum 140. The drive roller 99 is connected by chain 96 to sprockets 88 with the feed roller thereon so that the bead filler stock will be fed to the surface of the building drum at the same linear speed of travel of the peripheral surface of the building drum 140. The bead ring or bundle 32 is supported on a hub structure 141 of the building drum 140. The drum 140 includes an annular frame member 148 which is engaged by drive wheel 146 driven by motor 144 through gear box 145.

The applicator arm or element 19, as depicted by Sec. B in FIG. 1, includes means to power the conveyor or roller system, such as motor 85. The conveyor system of the applicator arm 19 and the main conveyor system 107 (as described by Sec. A in FIG. 1) are joined by means of a clutch assembly 84 located at the pivot 94 (FIG. 9) between the applicator arm and the main conveyor system. The applicator arm 19 is equipped with means by which it can be raised or lowered, such as a cylinder 142, as depicted by the dotted lines in FIG. 1.

The applicator arm conveyor system is powered by motor 85 through feed rollers 88 which are operatively linked together by chain 90 (FIG. 9 and 4). A shaft encoder 82 (FIG. 1) is positioned in an intermediate position between the applicator arm pivot 94 and the end of the applicator arm 19. The encoder 82, through other suitable electrical hardware, controls the clutch assembly 84 and motor 85. The encoder 82 provides signals to help control a number of operations in the filler stock application cycle. For example, the applicator arm 19 is in the upward-raised position, clutch assembly 84 is engaged with sprocket rolls 88 and both sections A and B (FIG. 1) are driven by motor 85. This advances the end of the filler stock 25 from the blade 104 to a distance measured out by the measuring wheel 101. The motor then shuts off, stopping movement of the strip of stock material while the stock is cut by cutting means 17. With the applicator arm still in the raised position the encoder 82 provides an electrical signal which switches the clutch assembly 84 to disengage and only the sprocket rollers 88 in section B are selectively driven by motor 85. This advances the end of the filler stock to a point above the drive roller 99. When the applicator arm is lowered onto the building drum 140 by retracting cylinder 142, the encoder, through appropriate switches, energizes motor 144 (FIG. 3) and building drum 140 is rotated approximately one revolution, which in turn drives the rubber drive wheel 99 which powers the feed rollers 88. The bead filler stock then wraps around the building drum as it is rotated. After about one rotation of the building drum, the applicator arm 19 is moved upwardly to the raised position. This completes the cutting, measuring and delivering cycle.

Figure 6:
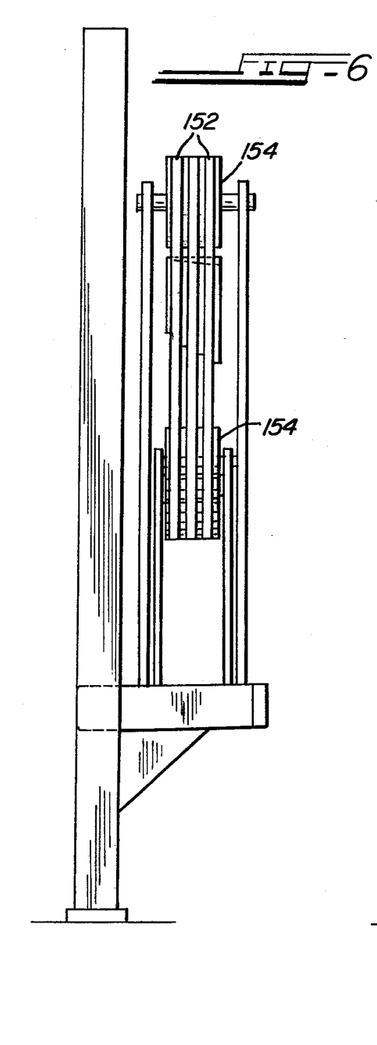
FIG. 6 is a fragmentary side elevational view of the mechanism for automatically applying the filler material onto the work station located in the applicator position in accordance with the present invention.
Figure 7:
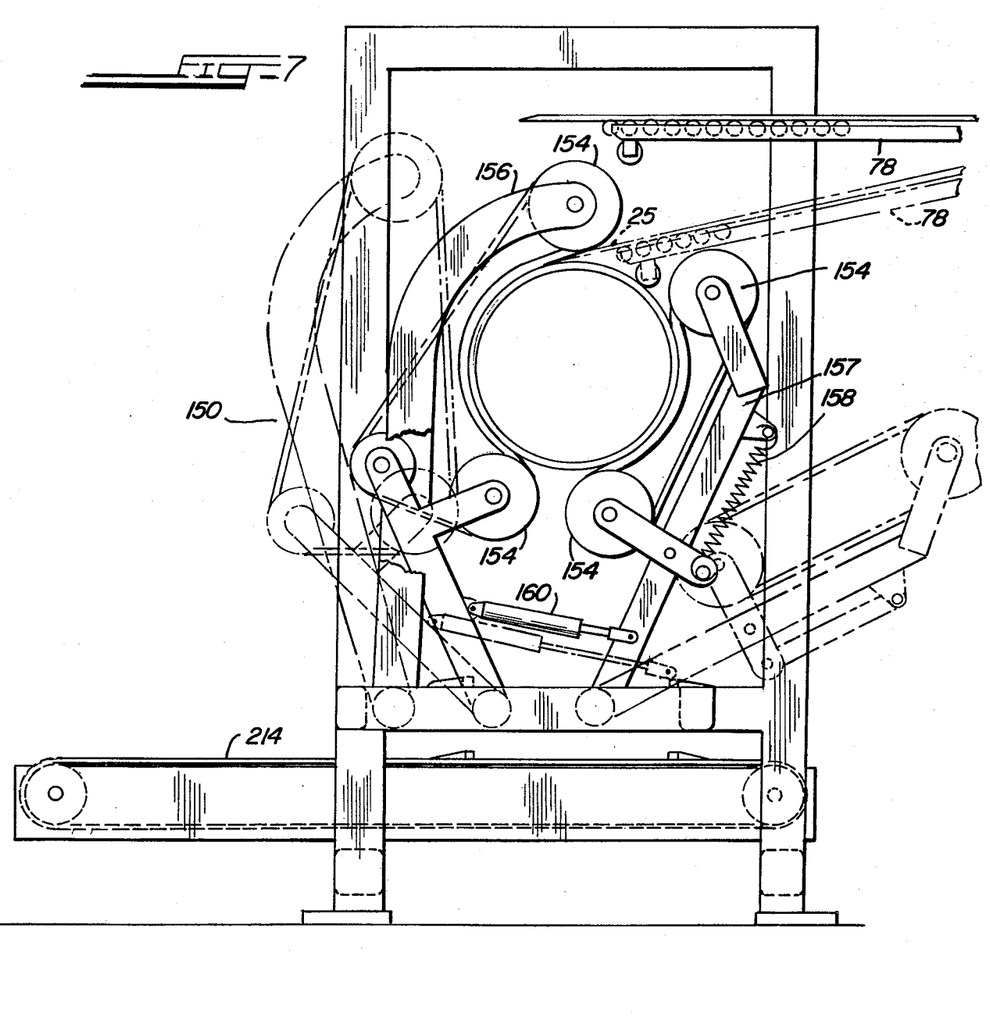
FIG. 7 is a side elevational view of the mechanism for automatically applying the filler material onto the work station located in the applicator position in accordance with the present invention.

As shown in FIGS. 6 and 7, an automatic application mechanism 150 is provided and includes a plurality of V-belts 152 mounted on rollers 154 rotatable on pivotally mounted frame elements 156 and 157. Each engagement mechanism includes the V-belts and roller assembly which are movably from an outward-disengaging position (shown by dotted lines in FIG. 7) to an inward engaging position wherein the belts 152 engage the bead filler material 25 and automatically apply and splice the material adajcent the mounted bead ring 32. Spring means 158 and cylinder means 160 are provided to selectively move the frame elements 156 and 157 to the outward-at rest position from the inward engaging position after each application cycle.

After the strip of bead filler material 25 is mounted on the building drum 140 and automatically applied thereon, it can be processed further into the fillered bead assembly 11. The present invention envisions the use of multiple work stations within the bead applicator assembly or portion 18.

Figure 3:
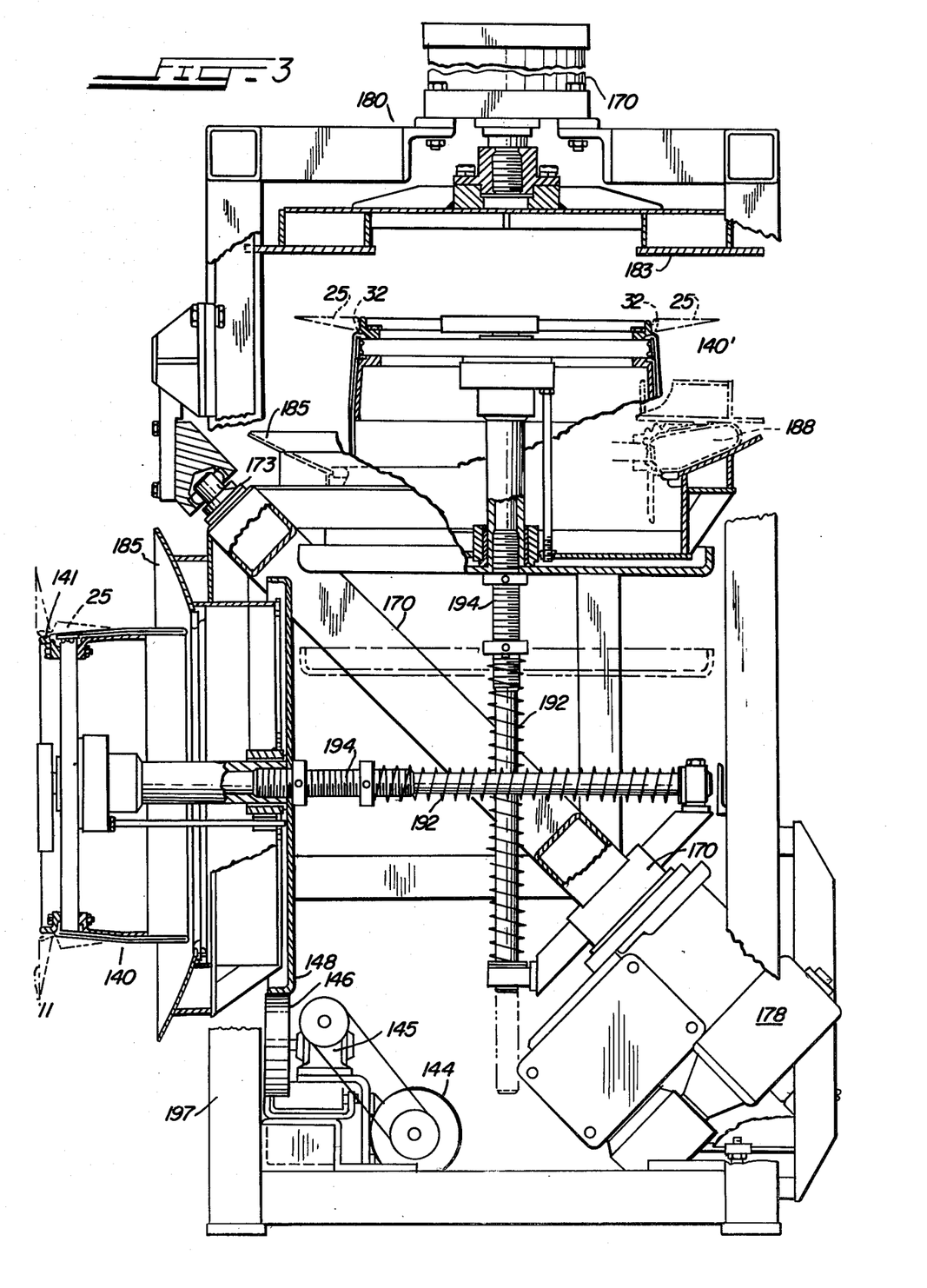
FIG. 3 is a plan view of a two-station bead filler applicator machine in accordance with the present invention.

Referring now to FIG. 3, there is shown a two-station bead filler assembly 18. The two-station apparatus includes two building drums 140 and 140' of known construction. These building drums consist of a bladder 188 positioned radially inwardly of the filler material 25 positioned thereon and a turn-up ring 185 surrounds the building drum and is attached to rotating frame 170. The building drums 140 and 140' are positioned at 90° angles on a pivot spindle 173. The pivot spindle 173 is mounted on a frame 170 and driven by a drive motor 178.

In operation, the applicator arm 19 is moved downward to engage drum 140 and a strip of filler material 25 is applied to the drum between the automatic application mechanism 150 and the drum. The applicator arm is then raised upwardly, and the bead ring 32 is positioned on the front of the drum which is then rotated to the forming position, as depicted by 180 in FIG. 3. It should be noted that it is generally preferred to position the tire bead ring 32 on the drum 140 and then apply the filler material 25 onto the drum. At the forming station, the flange 183 descends to position the bead ring 32 on the building drum and pushes the primary building drum 140', which is slideably mounted on a spring loaded shaft, into the turn-up ring 185, as the bladder 188 is inflated. The inflation of the bladder 188 forces the bead filler material 25 to extend upward and outward as it is pressed between the flange 183 and the bladder 188 supported by the turn-up ring 185. Flange 183 is then pulled upward by the air cylinder 170 and the building drum 140' is returned to the outward at-rest position, by the spring 192 on the shaft 194. During this operation, the other building drum 140 is being loaded with another band of filler material 25 and a bead ring 32. These operations being completed, the pivot spindle 173 rotates the building drum 140 with the new strip to the forming work station and the building drum with the finished bead assembly to the applicator station. The finished filler bead assembly is then removed from drum 140 and a new strip of bead filler material can be deposited on the drum. This completes the cycle of operation.

Figure 5:
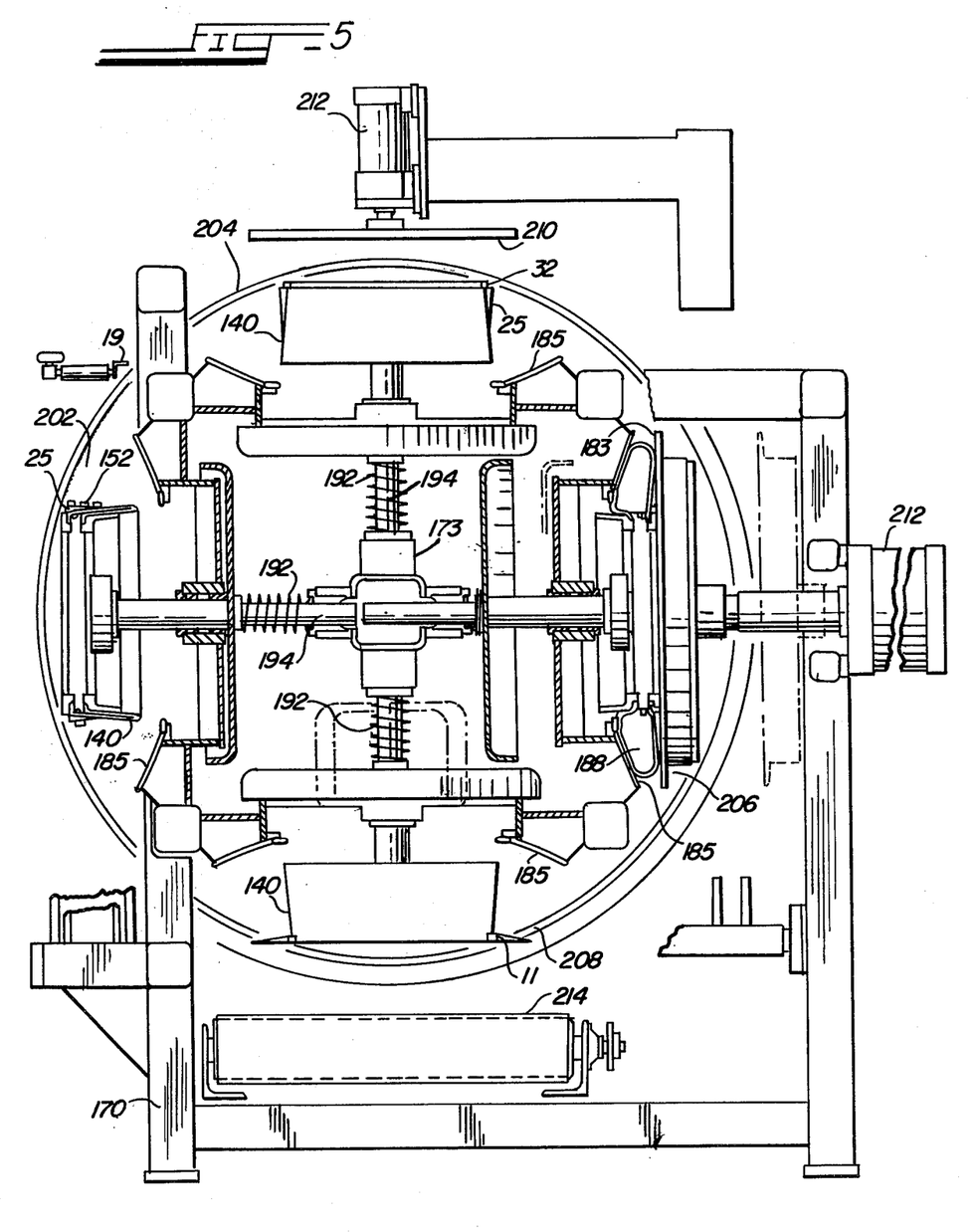
FIG. 5 is a plan view of a further embodiment showing a four-station bead filler applicator machine in accordance with the present invention.

FIG. 5 illustrates an alternative embodiment of the present invention involving a bead fillering assembly with four stations. Four building drums 140 are mounted in a plane on spring loaded shafts 194. The building drums 140 and turn-up rings 185 and spring loaded shafts 194 are mounted on rotatable pivot 173 within frame 190. At the first application station, designated 202, bead filler material 25 is automatically placed upon the building drum 140 by the application mechanism 150. That drum then rotates to station 2, desinated 204, as the building drum that was in removal station No. 4, designated 208, moves up into the loading position. At station No. 2, the wire bundle is automatically positioned on the primary drum by positioning plate 210 which descends by means of an air cylinder 212. After the wire bundle has been positioned, the positioning plate 210 is returned outwardly and the drum 140 is then rotated to station 3, designated as 206. At station 3, flange 183 forces the spring loaded drum inwardly into the turn-up ring 185 as the bladder 188 is inflated forcing the bead filler material into an outwardly extended position. After flange 183 is returned by the air cylinder 212 and building drum 140 returns to its at rest position, the building drum is then rotated to station 4, designated as 208. At station 4, the completed bead assembly 11 is pushed off the primary building drum 140 into a conveyor 214 for further processing into a completed tire. It is also contemplated within the scope of the present invention that the rotation of the fillered material to engage the bead ring is not limited to a planar fillered bead configuration. The building drum 140 can then be rotated to station 1 thereby completing the cycle. The use of a four-station bead fillering assembly increases the rate at which bead fillering assemblies can be completed.

Thus, while I have illustrated and described the preferred embodiment of my invention, it is to be understood that this is capable of variation and modification, and I, therefore, do not wish to be limited to the precise details set forth, but desire to avail myself of such changes and alterations as fall within the purview of the following claims.

We claim:

1. The method of manufacturing fillered bead assemblies, including the steps of:

extruding continuously bead filler material,
   accumulating the extruded filler material,
   cutting the extruded filler material into predetermined lengths,
   placing the bead and predetermined length of filler material in cylindrical form on an axially resilient mounted drum means having an inflatable bag positioned radially inwardly of said filler material, and
   forming the fillered bead assembly by inflating said bag between two plates to rotate the filler materil about the bead, with one of said two plates being planar and positioned adjacent the bead to prevent the rotated filler material from being rotated beyond the centerline of the bead to form a planar cylindrical fillered bead assembly.

2. The method of manufacturing fillered bead assemblies in accordance with claim 1 further including the step of measuring the filler material to predeterminedly control the length of the filler material prior to the step of cutting the filler material.

3. A method of manufacturing fillered bead assemblies comprising, extruding continuously bead filler material from an extruder,
   conveying said bead filler material sequentially to a plurality of axially resiliently mounted drum means, each of said drum means having an inflatable bag for receiving said bead filler material and a turn-up plate member,
   measuring and cutting said bead filler material as said bead filler material is conveyed to said drum means by means of measuring means which measures said bead filler material into predetermined lengths corresponding to the length of the circumference of said drum means and triggers a cutting assembly means which cuts the continuous extruded bead filler material into a strip of predetermined length,
   accumulating said bead filler material as said bead filler material is being cut,
   placing the bead and strips of bead filler material in cylindrical forms on one of said drum means,
   moving said drum means with bead and a strip of bead filler material to a second work station while a second drum means is moved in position to receive a bead and a strip of bead filler material,
   inflating said inflatable bag of said first drum means and simultaneously engaging said bag with said turn-up plate member and positioning a flange plate member having a planar surface adjacent the bead to prevent rotation of the bead filler material beyond the centerline of the bead thereby forming a finished planar cylindrical bead fillered assembly as said second drum receives bead and a strip of bead filler material,
   discharging said bead fillered assembly from said first drum means, and
   repositioning said first drum means to receive a bead and a strip of bead filler material to repeat the cycle of operation.

4. A continuously operating bead filler assembly in combination:

an extruder for extruding bead filler material, an accumulator for accumulation of the extruded filler material, a cutting, measuring and feeding means for selectively measuring, cutting and delivering the extruded and accumulated bead filler material, and a multiple work station machine having at least one station for forming and rotating the cut and measured bead filler material onto the bead and at least one station for placing the bead and positioning the filler material in planar cylindrical form adjacent the bead, said at least one station including positioning of a bladder between two plates to thereby rotate said bead filler material onto the bead, with one of said two plates being planar and positioned adjacent the bead to prevent the rotated bead filler material from being rotated beyond the centerline of the bead to form a planar cylindrical bead filler assembly.

5. The bead filler assembly in accordance with claim 1 wherein said at least one station for positioning the filler material adjacent the bead includes a plurality of belt means engageable with said at least one station for automatically applying the filler material adjacent the bead.

6. The bead filler assembly in accordance with claim 1 wherein said cutting means includes a knife which engages the filler material while the filler material is retained by clamp means.

7. The bead filler assembly in accordance with claim 1 wherein said feeding means includes positive drive conveyor means to prevent distoration of the filler material during positioning in cylindrical form adjacent the bead.

8. A continuously operating bead filler assembly including in combination:

an extruder for extruding bead filler material, an accumulator for accumulation of the extruded filler material, a cutting, measuring and feeding means selectively measuring, cutting and delivering bead filler material, and a multiple work station mechanism having at least four work stations, a first work station adapted to receive filler material thereon, a second work station adapted to position the bead ring adjacent the filler material, a third work station for forming and rotating the filler material onto the bead, with said third work station including positioning a bladder between two plate members, one of said two plate members compressing said bladder to rotate the filler material onto the bead and the other of said two plate members having a planar surface positioned adjacent the bead to prevent the rotated filler material from being rotated beyond the centerline of the bead to thereby form a planar cylindrical bead filler assembly, and a fourth station for removal of the completed planar fillered bead assembly.

* * * * *

UNITED STATES PATENT AND TRADEMARK OFFICE
CERTIFICATE OF CORRECTION

PATENT NO. : 4,468,266
DATED : August 28, 1984
INVENTOR(S) : Leon J. Cole, et al.

It is certified that error appears in the above-identified patent and that said Letters Patent is hereby corrected as shown below:

Column 1, line 42, "extended" should read -- extruded --.
Column 10, line 66, after "assembly" insert -- including --.

Signed and Sealed this

Twenty-sixth Day of March 1985

[SEAL]

Attest:

DONALD J. QUIGG

Attesting Officer

Acting Commissioner of Patents and Trademarks